United States Patent
Challener et al.

(10) Patent No.: US 8,205,197 B2
(45) Date of Patent: Jun. 19, 2012

(54) APPARATUS, SYSTEM, AND METHOD FOR GRANTING HYPERVISOR PRIVILEGES

(75) Inventors: David Carroll Challener, Raleigh, NC (US); Mark Charles Davis, Durham, NC (US); Randall Scott Springfield, Chapel Hill, NC (US); Rod D. Waltermann, Rougemont, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 889 days.

(21) Appl. No.: 12/269,668

(22) Filed: Nov. 12, 2008

(65) Prior Publication Data

US 2010/0122250 A1 May 13, 2010

(51) Int. Cl.
*G06F 9/455* (2006.01)
*G06F 9/46* (2006.01)
(52) U.S. Cl. ............................................................ 718/1
(58) Field of Classification Search ........................ None
See application file for complete search history.

(56) References Cited

U.S. PATENT DOCUMENTS

| 6,496,847 | B1 * | 12/2002 | Bugnion et al. | 718/1 |
| 7,424,709 | B2 * | 9/2008 | Neiger et al. | 718/1 |
| 7,581,219 | B2 * | 8/2009 | Neiger et al. | 718/1 |
| 7,814,495 | B1 * | 10/2010 | Lim et al. | 718/104 |
| 7,865,893 | B1 * | 1/2011 | Omelyanchuk et al. | 718/1 |
| 2009/0172661 | A1 * | 7/2009 | Zimmer et al. | 718/1 |
| 2009/0287571 | A1 * | 11/2009 | Fujioka | 705/14.54 |
| 2009/0328195 | A1 * | 12/2009 | Smith | 726/16 |

* cited by examiner

*Primary Examiner* — Corey S Faherty
(74) *Attorney, Agent, or Firm* — Kunzler Needham Massey & Thorpe

(57) ABSTRACT

An apparatus, system, and method are disclosed for granting hypervisor privileges. An installation module installs a monitor hypervisor wherein only the monitor hypervisor is granted the hypervisor privileges by the computer. An authentication module authenticates a second hypervisor. An eviction module evicts the monitor hypervisor if the second hypervisor is authenticated. The installation module further installs the second hypervisor after the monitor hypervisor is evicted so that only the second hypervisor is granted hypervisor privileges by the computer.

20 Claims, 8 Drawing Sheets

APPARATUS, SYSTEM, AND METHOD FOR GRANTING HYPERVISOR PRIVILEGES

BACKGROUND OF THE INVENTION

1. Field of the Invention

This invention relates to granting privileges and more particularly relates to granting hypervisor privileges.

2. Description of the Related Art

The hardware of a single computer may be organized to simulate the operation of two or more virtual computers. For example, a hypervisor may be installed on the single computer. The hypervisor may manage the allocation of computer resources into two or more virtual computers. For example, the hypervisor may allocate a first block of memory to a first virtual computer and a second block of memory to a second virtual computer.

In addition, the hypervisor may allow two or more operating systems (OS) to execute on the virtual computers. A context of each OS may run on separate virtual computers. The hypervisor may manage the switching of contexts between each OS.

The partitioning of the computer hardware into multiple virtual computers can significantly reduce the cost of providing multiple computers. As a result, significant hardware and software support is provided for hypervisors and virtual computers. Unfortunately, this hardware and software support for hypervisors may be used by malicious programs. For example, a virus may install itself as a hypervisor and use hypervisor privileges to circumvent computer security protection.

SUMMARY OF THE INVENTION

From the foregoing discussion, there is a need for an apparatus, system, and method that automates granting hypervisor privileges. Beneficially, such an apparatus, system, and method would grant hypervisor privileges to prevent installation of a malicious program as a hypervisor.

The present invention has been developed in response to the present state of the art, and in particular, in response to the problems and needs in the art that have not yet been fully solved by currently available apparatus, systems and methods for granting hypervisor privileges. Accordingly, the present invention has been developed to provide an apparatus, system, and method for granting hypervisor privileges that overcome many or all of the above-discussed shortcomings in the art.

The apparatus for granting hypervisor privileges is provided with a plurality of modules configured to functionally execute the steps of installing a monitor hypervisor, authenticating a second hypervisor, evicting the monitor hypervisor, and installing the second hypervisor. These modules in the described embodiments include an installation module, an authentication module, and an eviction module.

The installation module installs a monitor hypervisor wherein only the monitor hypervisor is granted the hypervisor privileges by a computer. The authentication module authenticates a second hypervisor.

The eviction module evicts the monitor hypervisor if the second hypervisor is authenticated. The installation module further installs the second hypervisor after the eviction of the monitor hypervisor so that only the second hypervisor is granted hypervisor privileges by the computer.

A system of the present invention is also presented for granting hypervisor privileges. In particular, the system, in one embodiment, includes a memory and a processor. The memory stores a plurality of computer readable programs. The processor is in communication with the memory and executes the computer readable programs. The computer readable programs comprise at least one OS, an installation module, an authentication module, and an eviction module.

The installation module installs a monitor hypervisor wherein only the monitor hypervisor is granted the hypervisor privileges by the processor. The authentication module authenticates a second hypervisor if the second hypervisor is signed by a private key with a corresponding public key known to the monitor hypervisor. The eviction module evicts the monitor hypervisor if the second hypervisor is authenticated. The installation module further installs the second hypervisor after the second hypervisor is evicted so that only the second hypervisor is granted the hypervisor privileges by the processor.

A method of the present invention is also presented for granting hypervisor privileges. The method in the disclosed embodiments substantially includes the steps to carry out the functions presented above with respect to the operation of the described apparatus and system. In one embodiment, the method includes installing a monitor hypervisor, authenticating a second hypervisor, evicting the monitor hypervisor, and installing the second hypervisor.

An installation module installs a monitor hypervisor wherein only the monitor hypervisor is granted the hypervisor privileges by the computer. An authentication module authenticates a second hypervisor. An eviction module evicts the monitor hypervisor if the second hypervisor is authenticated. The installation module further installs the second hypervisor after the monitor hypervisor is evicted so that only the second hypervisor is granted hypervisor privileges by the computer.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention automates granting hypervisor privileges. Beneficially, such an apparatus, system, and method would increase computer security by deterministically granting hypervisor privileges to prevent a virus or malicious program from installing itself as a hypervisor. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs when executed by a computer system may perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
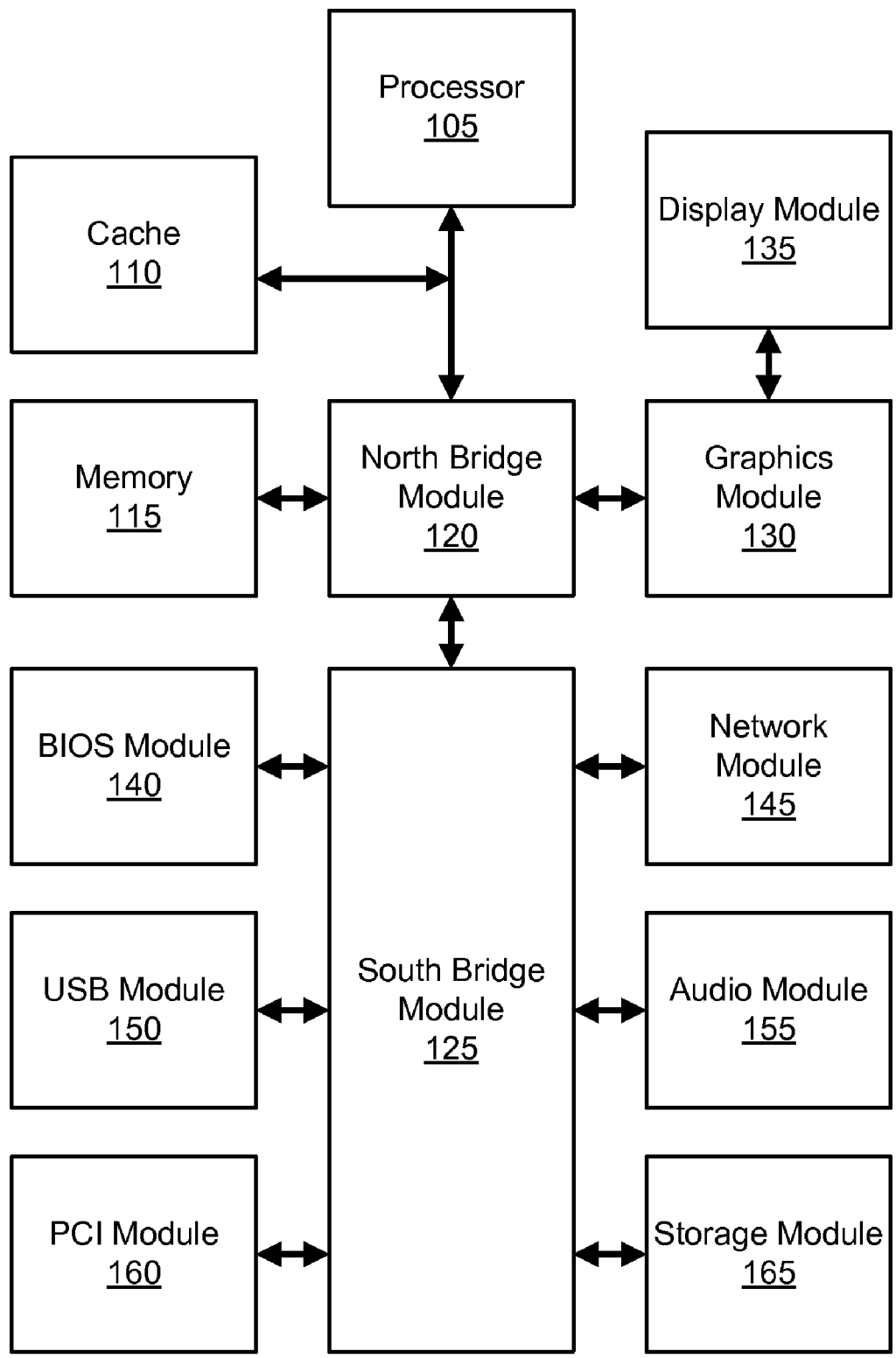
FIG. 1 is a schematic block diagram illustrating one embodiment of a computer of the present invention.

FIG. 1 is a schematic block diagram illustrating one embodiment of a computer 100 in accordance with the present invention. The computer 100 includes a processor 105, a cache 110, a memory 115, a north bridge module 120, a south bridge module 125, a graphics module 130, a display module 135, a Binary Input/Output System (BIOS) module 140, a network module 145, a Universal Serial Bus (USB) module 150, an audio module 155, a Peripheral Component Interconnect (PCI) module 160, and a storage module 165.

Although for simplicity, one processor 105, one cache 110, one memory 115, one north bridge module 120, one south bridge module 125, one graphics module 130, one display module 135, one BIOS module 140, one network module 145, one USB module 150, one audio module 155, one PCI module 160, and one storage module 165 are shown with the computer 100, any number of processors 105, caches 110, memories 115, north bridge modules 120, south bridge modules 125, graphics modules 130, display modules 135, BIOS modules 140, network modules 145, USB modules 150, audio modules 155, PCI modules 160, and storage modules 165 may be employed. The processor 105, cache 110, memory 115, north bridge module 120, south bridge module 125, graphics module 130, display module 135, BIOS module 140, network module 145, USB module 150, audio module 155, PCI module 160, and storage module 165, referred to herein as components.

These components may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores a plurality of computer readable programs. The memory 115 may include a volatile memory selected from a Dynamic Random Access Memory (DRAM), a Static Random Access Memory (SRAM), or the like, a non-volatile memory such as read only memory (ROM), a flash memory, and the like.

The processor 105 is in communication with the memory 115. In addition, the processor 105 executes the computer readable programs. The processor 105 may include a plurality of processing units. The processing units may be implemented as processing cores, as Hyper-Threading (HT) technology, or the like. The processor 105 may communicate over an integrated circuit (IC) processor bus for example, of two gigahertz (2 GHz). The processor 105 may also include sufficient memory to store small quantity of data. The memory of the processor 105 may include a plurality of system registers as is well known to those of skill in the art.

A chipset may serve to interconnect various hardware components. The chipset may include one or more bridges and/or hubs, as well as other logic and storage components. The chipset may include the north bridge module 120 and the south bridge module 125. In an example, the processor 105 may be communicatively coupled to a security processor such as trusted platform module (TPM) via the chipset as is well known to those of skill in the art. The TPM may be an IC chip. The TPM may be used to protect and attest the data to a runtime configuration of the processor 105.

The processor 105 may support and execute in an operating mode selected from a kernel mode, a protected mode, a user mode, a real mode, a virtual machine extension (VMX) or virtualization enabled (VE) mode, a non-VMX or virtualization disabled (VD) mode, and/or the like. The operating modes for the processor 105 may place restrictions on operations that may be performed by a process running in the processor 105. For example, the processor 105 may allow the OS to run at different privilege levels or rings when referring to their implementation at the OS abstraction level.

The storage module 165 may include one or more tangible storage devices such as optical storage devices, holographic storage devices, micromechanical storage devices, semiconductor storage devices, hard disk drives, magnetic tapes, or the like. The storage module 165 may communicate with the south bridge module 125 to store or access stored computer readable programs. The computer readable programs may be tangibly stored on the storage module 165.

The processor 105 may communicate with the cache 110 through a processor interface bus to reduce average time to access the memory 115. The cache 110 may store copies of the data from the most frequently used storage module locations. The cache 110 may be controlled by a microcontroller in the storage module 165. The microcontroller may be a single IC and may have sufficient memory and interfaces needed for an application. The computer 100 may use one or more caches 110, for example, one or more DDR2 cache memories, as is well known to those of skill in the art.

The north bridge module 120 may communicate with and hence may provide a bridging functionality between the processor 105 and the graphics module 130 through a 26-lane PCI express bus, the memory 115, and the cache 110. The north bridge module 120 may be configured as an IC as is well known to those of skill in the art. The processor 105 may be connected to the north bridge module 120 over, for example, a six hundred sixty seven Megahertz (667 MHz) front side bus as is well known to those of skill in the art.

The north bridge module 120 may be connected to the south bridge module 125 through a direct media interface (DMI) bus. The DMI bus may provide a high-speed bi-directional point-to-point link supporting a clock rate for example of the value of two gigabytes per second (2 GBps) in each direction between the north bridge module 120 and the south bridge module 125. The south bridge module 125 may be configured as an IC as is well known to those of skill in the art.

The south bridge module 125 may also include an integrated USB controller. The south bridge module 125 may communicate with the USB module 150 through the USB controller. The USB controller may support a Bluetooth interface, a built-in camera, a built-in track pad, a keyboard, an expresscard/34 slot, an external USB port, or the like.

The PCI module 160 may communicate with the south bridge module 125 for transferring data or to power peripheral devices. The PCI module 160 may include a PCI bus for attaching the peripheral devices. The PCI bus can logically connect one or more peripheral devices such as printers, scanners, or the like. The PCI module 160 may be configured as a planar device IC fitted onto a motherboard. The PCI module 160 may also be configured as an expansion card as is well known to those of skill in the art.

The network module 145 may communicate with the south bridge module 125 to allow the computer 100 to communicate with other devices over a network. The devices may include routers, bridges, computers, printers, and the like.

The computer readable programs may be part of a software environment. The computer readable programs comprise at least one OS, an installation module, an authentication module, and an eviction module. In addition, the computer readable programs may include the BIOS module 140, a system management mode (SMM) module, a virtual machine monitor (VMM) module or hypervisor, user applications, or the like as is well known to those of skill in the art. Typically, the VMM may execute in the VMX operating mode, while one or more virtual computers may execute in the non-VMX operating mode.

The BIOS module 140 may communicate instructions through the south bridge module 125 to boot the computer 100, so that software instructions stored on the memory 115 can load, execute, and assume control of the computer 100. Alternatively, the BIOS module 140 may comprise code and data embedded on a chipset that recognizes and controls various devices that make up the computer 100.

For example, the BIOS module 140 may progress through various phases during the boot process and may further hand over a control of the computer 100 to the hypervisor. Alternatively, the BIOS may hand over the control to the OS and the OS may further hand over the control to the hypervisor. The hypervisor may further create one or more virtual computers to support one or more guest OSs.

During booting of the computer 100, the processor 105 may initiate itself into a real mode, and then begin loading computer readable programs automatically into RAM from ROM and/or hard disk. A program inserted during the boot sequence may be used to put the processor 105 into a protected mode as will be described hereafter.

Figure 2:
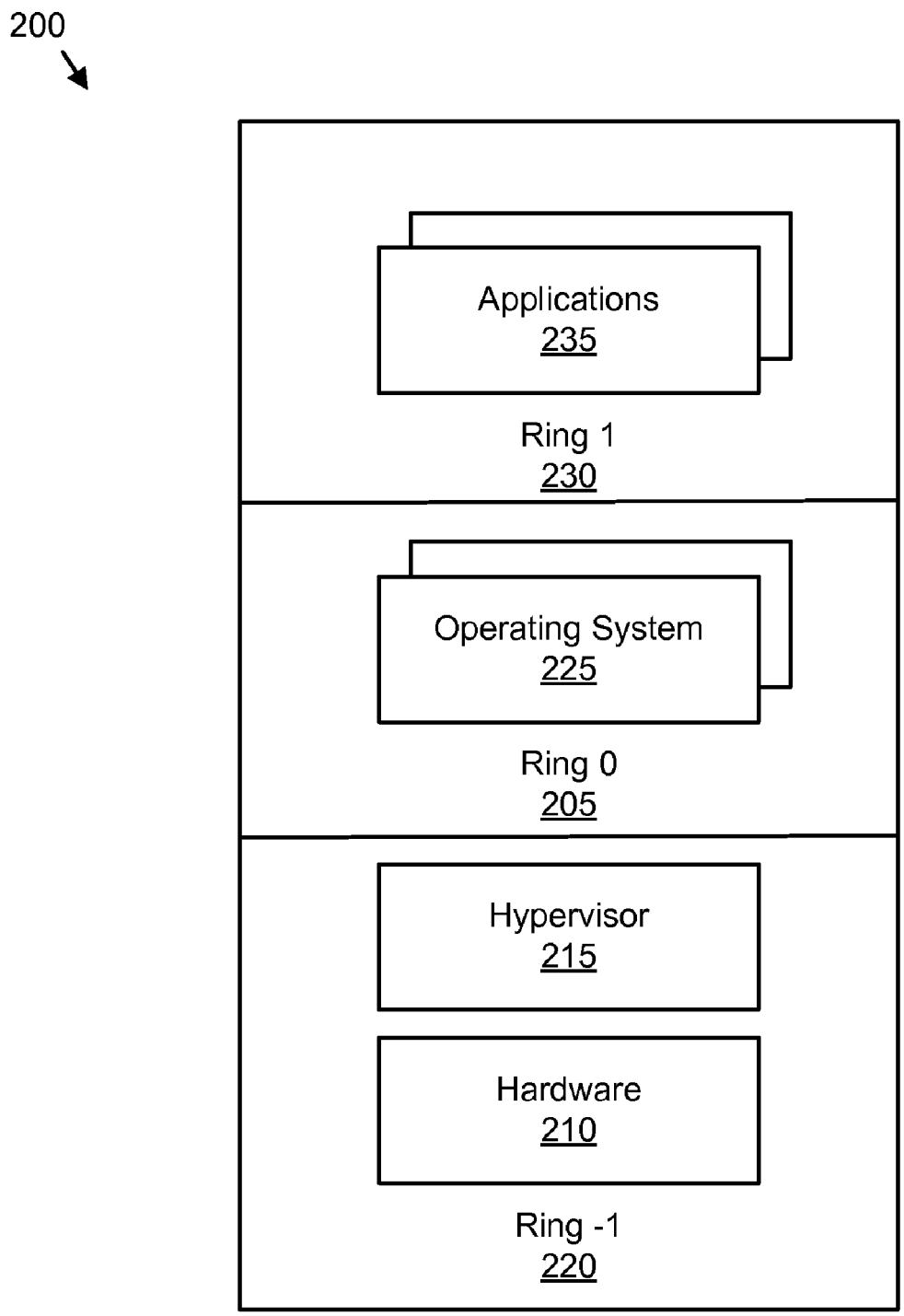
FIG. 2 is a schematic block diagram illustrating one embodiment of software organization of the present invention.

FIG. 2 is a schematic block diagram illustrating one embodiment of a software organization 200 of the present invention. The software organization 200 includes a ring −1 mode 220, ring 0 mode 205, and a ring 1 mode 230. The description of the software organization 200 refers to elements of FIG. 1, like numbers referring to like elements. Although, for simplicity, one ring −1 mode 220, one ring 0 205, and one ring 1 mode 230 are shown in the software organization 200, any number of ring modes may be employed. For simplicity, ring 1 mode 230 includes all ring modes higher than ring 1 mode 230.

In the shown embodiment, the ring −1 mode 220 includes hardware 210 and hypervisor 215. Ring 0 mode 205 includes the OS 225. In addition, the ring 1 mode 230 is shown including one or more applications 235. Although, for simplicity one hardware 210 and one hypervisor 215, are shown with the ring −1 mode 220, any number of hardware 210 and hypervisors 215 may be employed.

The hardware 210 may include the memory 115 such as the DRAM, SRAM, ROM, or the like, the processor 105, a coprocessor, or the like. The OS 225 may include a plurality of OSs such as UNIX®, LINUX®, WINDOWS®, AIX®, or the like.

Computer architectures such as Intel® x86, AMD®-V, or the like may support the ring −1 mode 220, ring 0 mode 205, and the ring 1 mode 230. The OS 225 may use the ring 0 mode 205 and the ring 1 mode 230 for computer security. For example, an OS may use only two ring modes, even if the hardware 210 may provide more than two operating modes as is well known to those of skill in the art.

The ring −1 mode 220 may have direct access to the hardware 210. The ring 0 mode 205 may represent a privilege level arranged in a hierarchy level to separate the OS 225 from one or more applications 235. The ring 0 mode 205 may interact with the ring −1 mode 220 to get direct access to the hardware 210. The ring 1 mode 230 may represent the privilege level with least privileges and may not interact directly with the hardware 210.

The hardware 210 may restrict the ways in which control can be passed from the ring −1 mode 220 to the ring 0 mode 205. For example, there may be a special gate or a set of instructions that may transfer control in a secure way from the ring 0 mode 205 to ring −1 mode 220 or vice-versa as is well known to those of skill in the art.

The hypervisor 215 may provide a virtualization platform that may allow multiple OSs 225 to run on the computer 100 at the same time. The hypervisor 215 may be selected from a type 1 hypervisor and a type 2 hypervisor as is well known to those of skill in the art. The hypervisor 215 configured as type 1 hypervisor also known as native or bare-metal hypervisor may be a computer readable program that may run directly on the hardware 210 as an OS control program or a host OS. The hypervisor 215 configured as type 2 also known as hosted hypervisor may be computer readable program that may run within the OS 225 or a guest OS. The hypervisor as described in this disclosure in FIG. 2 is a Type 1 hypervisor. The hypervisor 215 may be implemented by a method selected from a binary-rewriting method for example, VMWARE® ESX® server, a para-virtualization method for example, XEN®, a hardware assist method for example, XEN® on Intel® TXT, AMD®-V, or the like as is well known to those of skill in the art.

In addition, the hypervisor 215 may manage the plurality of virtual computers to ensure that the plurality of virtual computers execute in parallel as if they are running on the hardware 210 and in isolation from each other. The hypervisor 215 may be started either in a booting sequence of the computer 100 or by execution of a hypervisor loader.

In an embodiment, the hypervisor 215 enforces a security policy for the computer 100. For example, the processor 105 may execute in the ring 0 mode 205 for a first virtual computer and in the ring 0 mode 205 for a second virtual computer. Each virtual computer may represent a complete virtual system, with the processor 105, memory 115, network module 145, storage module 165, BIOS module 140, and the like. In a particular example, the WINDOWS® OS and the LINUX® OS may be executed in the first virtual computer and the second virtual computer respectively.

The applications 235 may include one or more user interfaces, databases, management consoles, networks, or the like. The OS 225 and the processor 105 may manage the applications 235 by running the applications in ring 1 mode 230 to protect against software-based attacks, increase confidentiality and integrity of sensitive information, protect sensitive information without compromising the usability of the hardware 210, and deliver increased security in the hardware 210 and/or OS 225 through measurement and protection capabilities as is well known to those of skill in the art.

Figure 3:
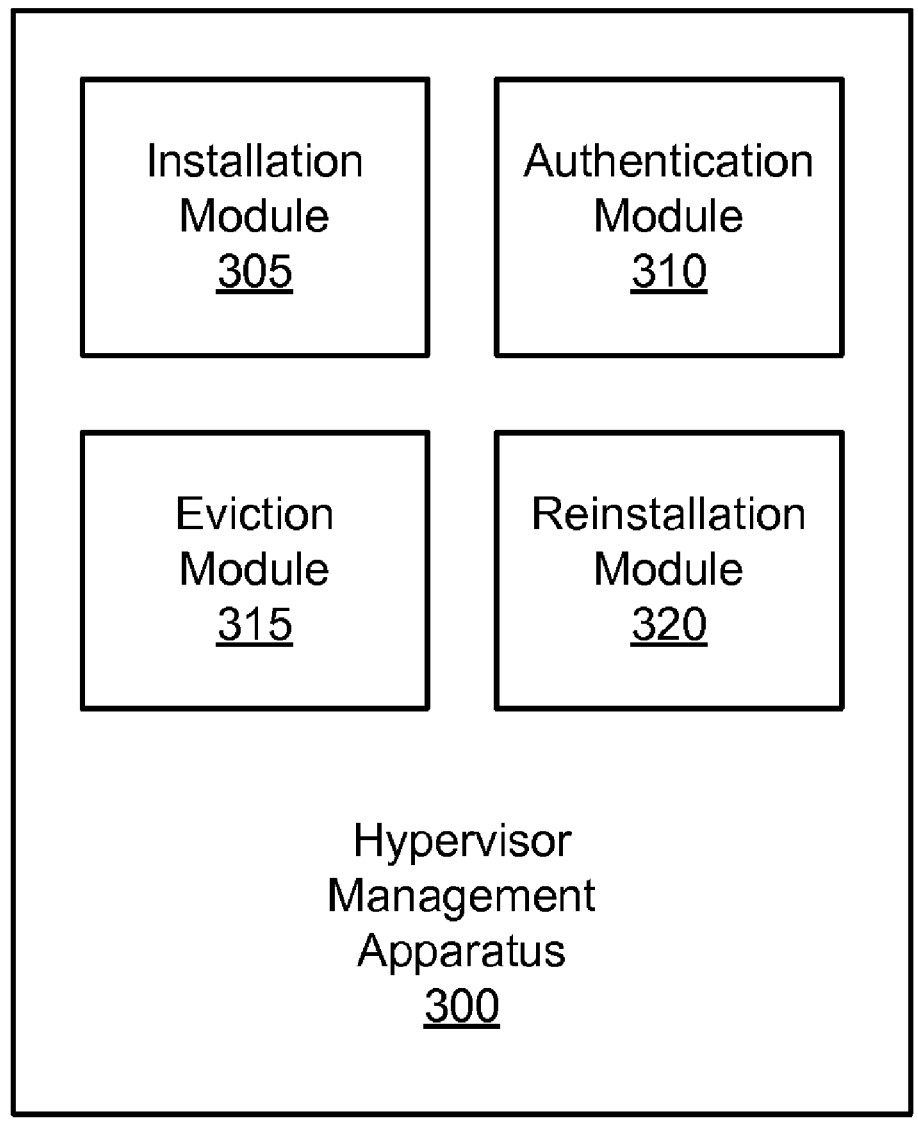
FIG. 3 is a schematic block diagram illustrating one embodiment of a hypervisor management apparatus of the present invention.

FIG. 3 is a schematic block diagram illustrating one embodiment of a hypervisor management apparatus 300 of the present invention. The apparatus 300 may be embodied in the computer 100 of FIG. 1. The apparatus 300 automates hypervisor management. The description of apparatus 300 refers to elements of FIGS. 1-2, like numbers referring to like elements. The apparatus 300 includes an installation module 305, an authentication module 310, and an eviction module 315. The apparatus 300 may also include a reinstallation module 320.

The installation module 305 installs a monitor hypervisor wherein only the monitor hypervisor is granted the hypervisor privileges by the computer 100. The hypervisor privileges may include a complete permission to perform an action. For example, the hypervisor privileges may include creating a file in a directory, reading or deleting a file, providing an access to the hardware 210, providing an access to the applications 225, or the like. In a particular embodiment, the hypervisor privileges comprise access to ring −1 mode 220 in a WINDOWS® software environment.

The hypervisor privileges may be granted by acquiring secured virtual machine secured kernel extensions (SVM SKINIT) privileges. Alternatively, in an embodiment, the hypervisor privileges are granted by acquiring a TXT SENTER interrupt. The TXT SENTER interrupt may be a software interrupt generated within the processor 105 by executing an instruction. The TXT SENTER interrupt may implement one or more subroutine system calls to change the ring mode of the processor 105 as is well known to those of skill in the art.

In an embodiment, the installation module 305 installs the monitor hypervisor during a boot of the computer 100. The installation module 305 may also install the monitor hypervisor using BIOS executable code. In addition, the installation module 305 may grant the ring −1 mode 220 to the monitor hypervisor.

The installation module 305 may include a computer readable program stored on a tangible storage device. The computer readable program is executed on the computer 100. In one embodiment, the computer readable program is stored on the memory 115 and executed by the processor 105.

The authentication module 310 authenticates a second hypervisor. The second hypervisor may be authenticated if the second hypervisor is signed by a private key with a corresponding public key known to the monitor hypervisor. The private key and public key may form a public/private key pair with the public key validating data signed with the private key.

The private key and the public key may be in a mathematical relation. In addition, the private key and public key may be generated by a key generation function using a large random number as is well known to those of skill in the art. The public key 410 may be widely distributed and the private key may be kept secret.

The authentication module 310 may include a computer readable program stored on a tangible storage device. The computer readable program is executed on the computer 100. In one embodiment, the computer readable program is stored on the memory 115 and executed by the processor 105.

The eviction module 315 evicts the monitor hypervisor if the second hypervisor is authenticated. The installation module 305 further installs the second hypervisor after the eviction of the monitor hypervisor so that only the second hypervisor is granted hypervisor privileges by the computer 100.

The eviction module 315 may include a computer readable program stored on a tangible storage device. The computer readable program is executed on the computer 100. In one embodiment, the computer readable program is stored on the memory 115 such and executed by the processor 105.

The reinstallation module 320 may reload the monitor hypervisor when the second hypervisor terminates. The reinstallation module 320 may include a computer readable program stored on a tangible storage device. The computer readable program is executed on the computer 100. In one embodiment, the computer readable program is stored on the memory 115 and executed by the processor 105.

For example, the BIOS module 140 may only load the monitor hypervisor during the boot of the computer 100. After the monitor hypervisor is evicted, the second hypervisor is loaded. The reinstallation module 320 may reload the monitor hypervisor when the second hypervisor terminates operation as will be described hereafter.

Figure 4:
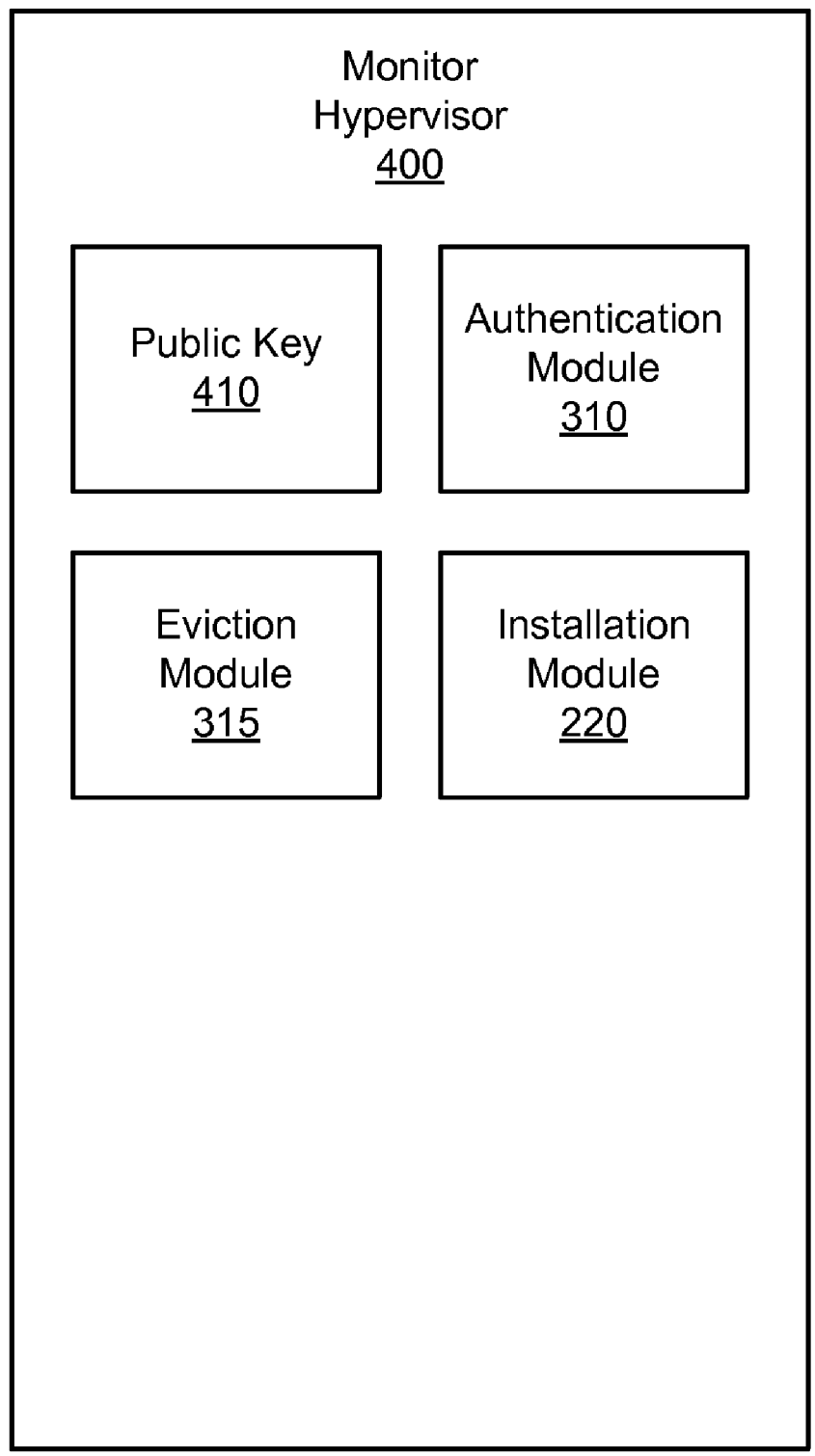
FIG. 4 is a schematic block diagram illustrating one embodiment of a monitor hypervisor of the present invention.

FIG. 4 is a schematic block diagram illustrating one embodiment of a monitor hypervisor 400 of the present invention. The monitor hypervisor 400 may be installed as the hypervisor 215 of FIG. 2. The description of the monitor hypervisor 400 refers to elements of FIGS. 1-3, like numbers referring to like elements. The monitor hypervisor 400 includes a public key 410, the installation module 305, and the authentication module 310.

The installation module 305 and authentication module 310 of FIG. 4 may be the installation module 305 and authentication module 310 of FIG. 3. The public key 410 may be a cryptographic key. The public key 410 may include a large random number, a hexadecimal number, or the like and used with a public key cryptographic algorithm to authenticate the data as is well known to those of skill in the art. In an embodiment, the public key 410 may be stored at a specified address in the memory 115.

The monitor hypervisor 400 is granted the hypervisor privileges by the computer 100. The hypervisor privileges may comprise access to ring −1 mode 220 in the WINDOWS® software environment. In an embodiment, the installation module 305 grants the ring −1 mode 220 to the monitor hypervisor 400. The hypervisor privileges may be granted by acquiring a TXT SENTER interrupt. The TXT SENTER interrupt may be an asynchronous signal from the hardware 210 or a synchronous event in the OS 225 that may indicate a need for a change in the operation mode of the processor 105.

The TXT SENTER interrupt may be selected from a hardware interrupt and a software interrupt. For example, the TXT SENTER interrupt may be implemented as one or more instructions in the computer architecture such as x86 of the processor 105 from Intel Corporation that may cause the processor 105 to save present state of execution via a context switch, and begin execution of an interrupt handler. The interrupt handler may switch execution of the processor 105 from real mode in the ring 1 mode 230 to the protected mode in the ring −1 mode 220 in the WINDOWS® software environment.

Alternatively, in an embodiment, the hypervisor privileges are granted by acquiring SVM SKINIT privileges. The SVM SKINIT privileges may be acquired by a set of SVM SKINIT instructions implemented as one or more instructions in the computer architecture of the processor 105 such as an AMD®-V from Advanced Mirco Devices, Inc. by disabling any interrupts, resetting one or more dynamic real-time program counter registers (PCRs) to zero (0), and the like to switch execution of the processor 105 from real mode in the ring 1 mode 230 to the protected mode in the ring −1 mode 220 in the hypervisor software environment.

Figure 5:
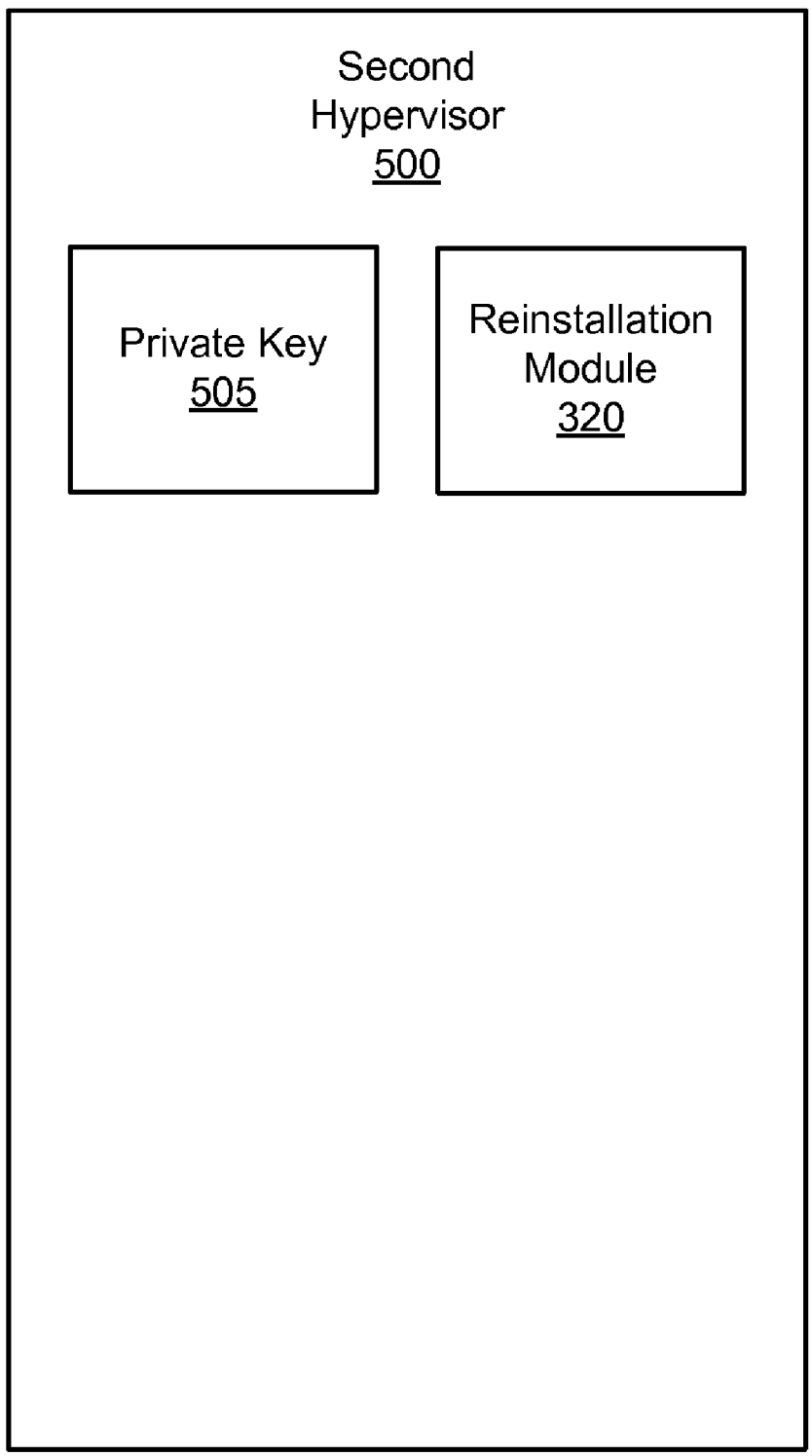
FIG. 5 is a schematic block diagram illustrating one embodiment of a second hypervisor of the present invention.

FIG. 5 is a schematic block diagram illustrating one embodiment of a second hypervisor 500 of the present invention. The second hypervisor 500 may also be installed as the hypervisor 215 of FIG. 2. The description of the second hypervisor 500 refers to elements of FIGS. 1-4, like numbers referring to like elements. The second hypervisor 500 includes a private key 505 and the reinstallation module 320. The description of reinstallation module 320 of FIG. 5 may refer to the description of reinstallation module 320 of FIG. 3.

The private key 505 may be a cryptographic key in pair with the public key 410. In addition, the private key 505 may not be known to the monitor hypervisor 400. The second hypervisor 500 may be signed with the private key 505 to create a digital signature for the second hypervisor 500. The second hypervisor 500 may be authenticated by the monitor hypervisor 400 using the private key 505 and the public key 410 as will be described hereafter.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
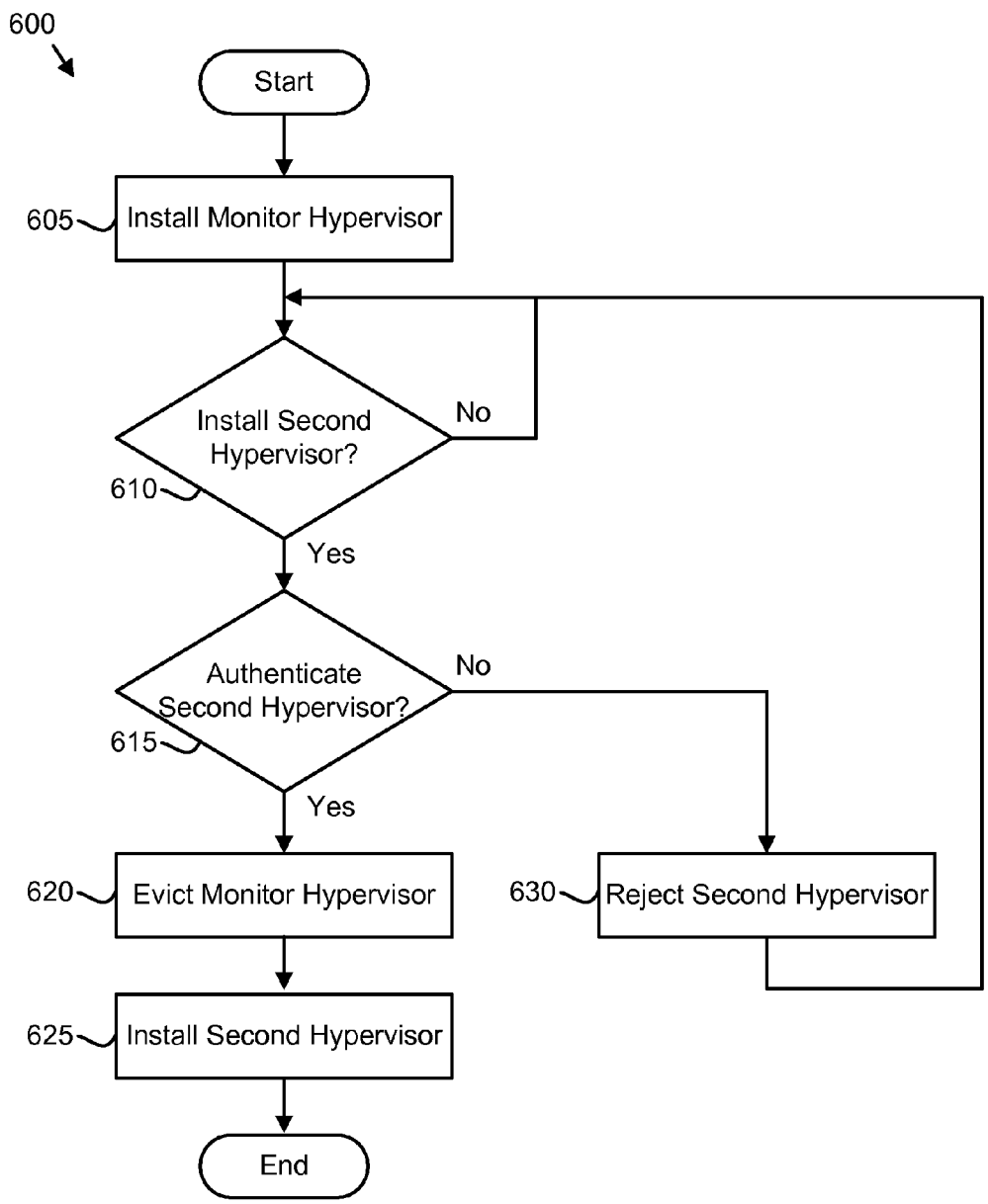
FIG. 6 is a schematic flow chart diagram illustrating one embodiment of a method for hypervisor management of the present invention.

FIG. 6 is a schematic flow chart diagram illustrating one embodiment of a method 600 for hypervisor management of the present invention. The method 600 substantially includes the steps to carry out the functions presented above with respect to the operation of the described apparatus 300 and computer 100. The description of the method 600 refers to elements of FIGS. 1-5, like numbers referring to the like elements. In one embodiment, the method 600 is implemented with a computer readable storage medium comprising a computer readable program stored on a tangible storage device. The computer readable program may be executed by the processor 105 of the computer 100.

The method 600 begins, and in an embodiment, the installation module 305 installs 605 the monitor hypervisor 400. In an embodiment, installation module 305 installs 605 the monitor hypervisor 400 during the boot of the computer 100. For example, when the user powers on the computer 100, the installation module 305 may automatically install 605 the monitor hypervisor 400 from a master boot record (MBR) code. The MBR code may include one or more instructions or data that may allow the installation module 305 to install 605 the monitor hypervisor 400 during the boot of the computer 100.

The installation module 305 may install 605 the monitor hypervisor 400 using BIOS executable code. For example, when processor 105 executes the BIOS executable code stored in the BIOS module 140, the installation module 305 may automatically install 605 the monitor hypervisor 400.

The installation module 305 may further determine 610 to install the second hypervisor 500. For example, if the second hypervisor 500 tries to load and/or the user generates a signal to install the second hypervisor 500 from the memory 115 or the storage module 165, the installation module 305 may determine 610 to install the second hypervisor 500.

Alternatively, the installation module 305 may automatically display a graphical user interface (GUI) on the display module 135. The GUI may receive an input from the user. Continuing with the above example, the installation module 305 may determine 610 to install the second hypervisor 500 when the user clicks an "Allow" option of the GUI to install 610 the second hypervisor 500.

If the installation module 305 determines 610 not to install the second hypervisor 500, the method 600 loops to step 610 and the monitor hypervisor 400 continues to execute. If the installation module 305 determines 610 to install the second hypervisor 500, the authentication module 310 authenticates 615 the second hypervisor 500. In an embodiment, the authentication module 310 authenticates 615 the second hypervisor 500 if the second hypervisor 500 is signed by the private key 505 corresponding to the public key 410. The authentication module 310 may employ a public-key digital signature algorithm to authenticate 615 the second hypervisor 500.

The authentication module 310 may hash an identifier for the second hypervisor 500 using a cryptographic hash function to calculate a first hash value. For example, the authentication module 310 may hash the identifier for the second hypervisor 500 to calculate the first hash value "12GHY676437436JUI." In addition, the authentication module 310 may sign the calculated first hash value with the private key 505 to create the digital signature of the second hypervisor 500 using a signing algorithm.

The authentication module 310 may further decrypt the created digital signature with the public key 410 to recalculate a second hash value using a signature verifying algorithm. For example, the authentication module 310 may decrypt the created digital signature with the public key 410 to recalculate the second hash value "12GHY676437436JUI."

The authentication module 310 may automatically match the first hash value with the second hash value. If the second hash value of the digital signature exactly matches with the initially calculated hash value of the second hypervisor 500, the authentication module 310 may authenticate 615 the second hypervisor 500. For example, the authentication module 310 may automatically match the first hash value "12GHY676437436JUI" with the second value "12GHY676437436JUI" to authenticate the second hypervisor 500.

If the authentication module 310 authenticates 615 the second hypervisor 500, the eviction module 315 evicts 620 the monitor hypervisor 400 by automatically uninstalling the monitor hypervisor 400. In one embodiment, the eviction module 315 terminates the privileges of the monitor hypervisor 400 and deallocates memory allocated to the monitor hypervisor 400.

The installation module 305 further installs 625 the second hypervisor 500 after the monitor hypervisor 400 is evicted so that only the second hypervisor 500 is granted hypervisor privileges by the computer 100 and the method 600 ends. For example, the installation module 305 may automatically receive a message indicating that the monitor hypervisor 400 is evicted. In response to the message indicating the eviction of the monitor hypervisor 400, the installation module 305 may install 625 the second hypervisor 500 so that only the second hypervisor 500 may have the access to ring −1 mode 220 in the hypervisor software environment.

If the authentication module 310 does not authenticate 615 the second hypervisor 500, the installation module 305 may reject 630 the second hypervisor 500 and the method 600 loops to step 610 to determine to install the second hypervisor 500. For example, the installation module 305 may automatically reject 630 the second hypervisor 500 by preventing the second hypervisor 500 from loading. Thus, the method 600 manages a plurality of hypervisors 215 by automatically granting hypervisor privileges. A malicious hypervisor that is not signed with the private key 505 cannot assume hypervisor privileges and defeat security measures for the OS and/or a security program.

Figure 7:
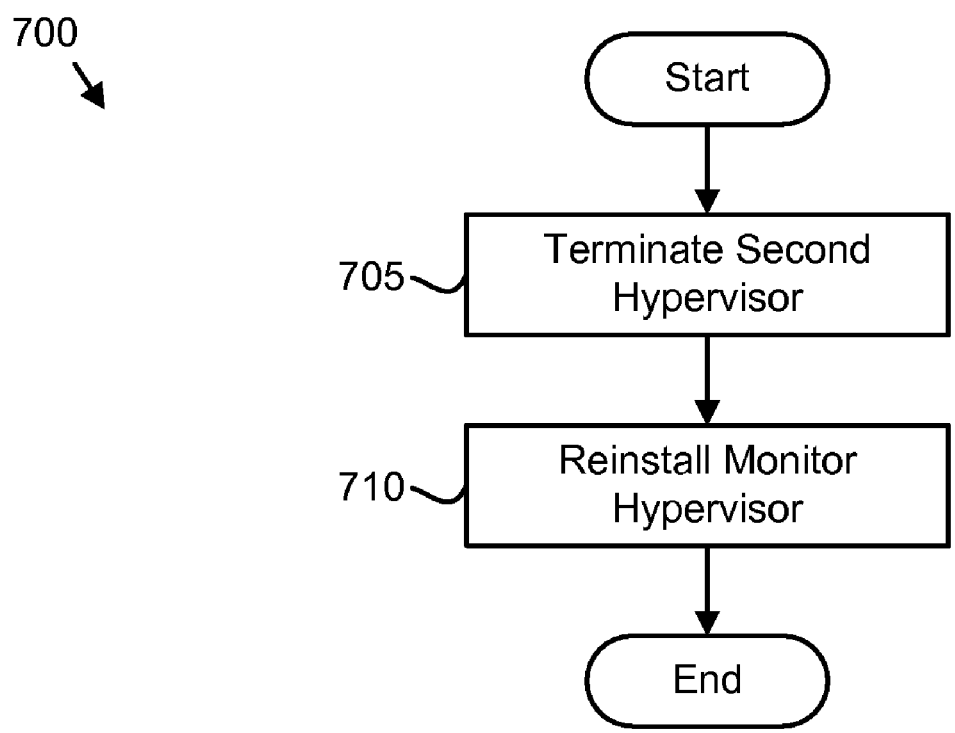
FIG. 7 is a schematic flow chart diagram illustrating one embodiment of a method for reloading the monitor hypervisor of the present invention.

FIG. 7 is a schematic flow chart diagram illustrating one embodiment of a method 700 for reloading the monitor hypervisor 400 of the present invention. The method 700 substantially includes the steps to carry out the functions presented above with respect to the operation of the described apparatus 300, method 600, and computer 100. The description of the method 700 refers to elements of FIGS. 1-6, like numbers referring to the like elements. In one embodiment, the method 700 is implemented with a computer readable storage medium comprising a computer readable program stored on a tangible storage device. The computer readable program may be executed by the processor 105 of the computer 100.

The method 700 begins, and in an embodiment, the second hypervisor 500 terminates 705. For example, the second hypervisor 500 may have completed operation such as when deactivated in response to a user command.

When the second hypervisor terminates 705, the reinstallation module 320 may reload 710 the monitor hypervisor 400. For example, if the second hypervisor terminates 705, the reinstallation module 320 may execute the BIOS executable code to reload 710 the monitor hypervisor 400. Alternatively, the reinstallation module 320 may include an address for a monitor hypervisor load routine and may branch to the address to reload 710 the monitor hypervisor 400.

The monitor hypervisor 400 will prevent other hypervisors 215 from loading unless authenticated as described in step 615 of FIG. 6. The method 700 thus automatically reloads the monitor hypervisor 500 to manage the plurality of hypervisors 215 by granting hypervisor privileges only to the monitor hypervisor 400 or an authenticated second hypervisor 500, preventing any malicious program from loading as the hypervisor 215.

Figure 8:
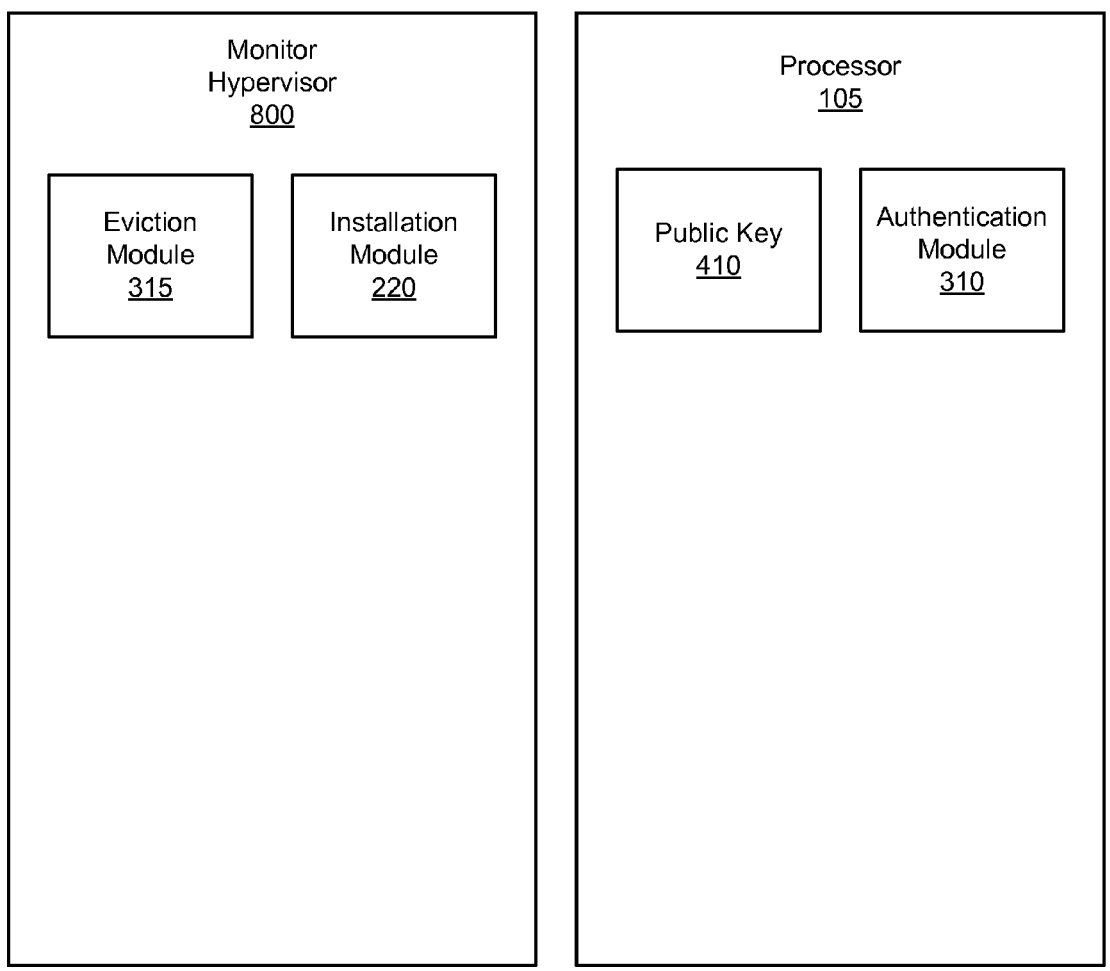
FIG. 8 is a schematic block diagram illustrating an alternate embodiment of a monitor hypervisor and processor of the present invention.

FIG. 8 is a schematic block diagram illustrating an alternate embodiment of embodiment of a monitor hypervisor 800 and processor 105 of the present invention. The monitor hypervisor 800 and processor 105 illustrate another embodiment for practicing the present invention. The description of the monitor hypervisor 800 and processor 105 refers to elements of FIGS. 1-7, like numbers referring to like elements.

In the depicted embodiment, the processor 105 stores the public key 410 that is used to authenticate the digital signature of the second hypervisor 500. In addition, the authentication module 310 is embodied in the processor 105. The authentication module 310 may be configured as a hardware circuit, a computer readable storage medium stored on the processor 105 and executed by the processor 105, or combinations thereof.

The present invention automates granting hypervisor privileges. Beneficially, such an apparatus, system, and method would increase computer security by deterministically granting hypervisor privileges to prevent any virus or malicious program from installing as the hypervisor 215. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium comprising a computer readable program for hypervisor management, wherein the computer readable program when executed on a computer causes the computer to:
install a monitor hypervisor wherein only the monitor hypervisor is granted the hypervisor privileges by the computer;
authenticate a second hypervisor;
evict the monitor hypervisor if the second hypervisor is authenticated; and
install the second hypervisor after the monitor hypervisor is evicted so that only the second hypervisor is granted hypervisor privileges by the computer.

2. The computer readable storage medium of claim 1, wherein the second hypervisor is authenticated if the second hypervisor is signed by a private key with a corresponding public key known to the monitor hypervisor.

3. The computer readable storage medium of claim 1, wherein the second hypervisor is further configured to cause the computer to reload the monitor hypervisor when the second hypervisor terminates.

4. The computer readable storage medium of claim 1, wherein the computer readable program is further configured to cause the computer to install the monitor hypervisor during a boot of the computer.

5. The computer readable storage medium of claim 4, wherein the computer readable program is further configured to cause the computer to install the monitor hypervisor using Binary Input/Output System (BIOS) executable code.

6. The computer readable storage medium of claim 1, wherein the hypervisor privileges comprise access to ring −1 mode in a hypervisor software environment.

7. The computer readable storage medium of claim 6, wherein the hypervisor privileges are granted by acquiring a TXT SENTER interrupt.

8. The computer readable storage medium of claim 6, wherein the hypervisor privileges are granted by acquiring SVM SKINIT privileges.

9. The computer readable storage medium of claim 6, wherein the computer readable program is further configured to cause the computer to grant access to the ring −1 mode to the monitor hypervisor.

10. An apparatus comprising:
- an installation module that installs a monitor hypervisor wherein only the monitor hypervisor is granted the hypervisor privileges by a computer;
- an authentication module that authenticates a second hypervisor;
- an eviction module that evicts the monitor hypervisor if the second hypervisor is authenticated; and
- the installation module further installing the second hypervisor after the eviction of the monitor hypervisor so that only the second hypervisor is granted hypervisor privileges by the computer.

11. The apparatus of claim 10, wherein the authentication module authenticates the second hypervisor if the second hypervisor is signed by a private key with a corresponding public key known to the monitor hypervisor.

12. The apparatus of claim 10, further comprising a processor that comprises the authentication module, wherein the authentication module authenticates the second hypervisor if the second hypervisor is signed by a private key with a corresponding public key known to the processor.

13. The apparatus of claim 10, wherein the second hypervisor further causes a reinstallation module to reload the monitor hypervisor when the second hypervisor terminates.

14. The apparatus of claim 10, wherein the installation module installs the monitor hypervisor during a boot of the computer.

15. The apparatus of claim 10, wherein the hypervisor privileges are granted by a process selected from acquiring a TXT SENTER interrupt and acquiring SVM SKINIT privileges.

16. A system comprising:
- a memory storing a plurality of computer readable programs;
- a processor in communication with the memory and executing the computer readable programs, the computer readable programs comprising:
  - at least one operating system;
  - an installation module that installs a monitor hypervisor wherein only the monitor hypervisor is granted the hypervisor privileges by the processor;
  - an authentication module that authenticates a second hypervisor if the second hypervisor is signed by a private key with a corresponding public key known to the monitor hypervisor;
  - an eviction module that evicts the monitor hypervisor if the second hypervisor is authenticated; and
  - the installation module further installing the second hypervisor after the second hypervisor is evicted so that only the second hypervisor is granted the hypervisor privileges by the processor.

17. The system of claim 16, wherein the installation module installs the monitor hypervisor using BIOS executable code during a boot of the system.

18. The system of claim 16, wherein the hypervisor privileges comprise access to −1 mode in a hypervisor software environment.

19. The system of claim 18, wherein the hypervisor privileges are granted by acquiring a TXT SENTER interrupt.

20. The system of claim 18, wherein the hypervisor privileges are granted by acquiring SVM SKINIT privileges.

* * * * *